US 6,621,188 B2

(12) United States Patent
An et al.

(10) Patent No.: US 6,621,188 B2
(45) Date of Patent: Sep. 16, 2003

(54) FLAT TYPE VIBRATION MOTOR (75) Inventors: Sang Gil An, Suwon (KR); Sung Tai Jung, Suwon (KR); Ta Kyoung Lee, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/260,095

(22) Filed: Sep. 27, 2002

(65) Prior Publication Data

US 2003/0025405 A1 Feb. 6, 2003

Related U.S. Application Data (62) Division of application No. 09/817,618, filed on Mar. 26, 2001, now Pat. No. 6,534,886.

(30) Foreign Application Priority Data

Jun. 26, 2001 (KR) .................................. 2000-35221

(51) Int. Cl.[7] ................................................. H02K 7/06
(52) U.S. Cl. ........................... 310/81; 310/43; 310/268
(58) Field of Search ........................... 310/81, 43, 261, 310/268; 601/60, 67, 70, 78, 80, 87; 340/311.1, 384.73, 407.1, 325.46

(56) References Cited

U.S. PATENT DOCUMENTS

| 3,584,249 | A | * | 6/1971 | Murphy ..................... 310/81 |
| 5,036,239 | A | | 7/1991 | Yamaguchi ................. 310/268 |
| 5,471,103 | A | * | 11/1995 | Fujii ......................... 310/81 |
| 5,942,833 | A | * | 8/1999 | Yamaguchi ................. 310/268 |
| 6,011,333 | A | * | 1/2000 | Yamaguchi et al. .......... 310/81 |
| 6,051,900 | A | * | 4/2000 | Yamaguchi ................. 310/81 |
| 6,246,143 | B1 | * | 6/2001 | Yamaguchi ................. 310/233 |

FOREIGN PATENT DOCUMENTS

| JP | 10-174361 | 6/1988 |
| JP | 10-295067 | 11/1988 |
| JP | 63-290140 | 11/1988 |
| JP | 63-290143 | 11/1988 |
| JP | 09-121506 | 5/1997 |
| JP | 10-295060 | 11/1998 |

* cited by examiner

Primary Examiner—Tran Nguyen
(74) Attorney, Agent, or Firm—Darby & Darby (57) ABSTRACT

A flat type vibration motor provides a weight on a round shaped upper substrate and a portion corresponding to a winding coil arranged at one side of the upper substrate to prevent the eccentric amount from being reduced due to a slim thickness of a rotor, thereby facilitating a slim size of the motor. The flat type vibration motor includes: a lower case; an upper case which covers an upper portion of the lower case; a shaft which connects the center of the lower case with the center of the upper case and supports them; a lower substrate attached to one portion on an upper side of the lower case; a magnet attached to the lower substrate and the upper side of the lower case; a round shaped thin upper substrate rotatably supported in the shaft; a commutator provided with a plurality of segments on the circumference of the center of the shaft at the bottom of the upper substrate; a pair of brushes of which one end is fixed to the lower substrate and other end is in contact with the commutator to be electrically connected with the commutator; a pair of winding coils arranged separated from each other at a constant angle toward one side of the upper substrate; a weight of high specific gravity arranged toward the other end of the upper substrate corresponding to the winding coil; and an insulator of resin filled between the winding coils and the weight, for firmly fixing the winding coils and the weight to the upper substrate.

2 Claims, 6 Drawing Sheets

FLAT TYPE VIBRATION MOTOR

This application is a Division of Ser. No. 09/817,618 filed Mar. 26, 2001 now U.S. Pat. No. 6,534,886.

BACKGROUND OF THE INVENTION

1. Field of the Invention

The present invention relates to a flat type vibration motor, and more particularly to a flat type vibration motor in which a weight of high specific gravity is provided on an upper substrate having a winding coil to ensure stable vibration characteristic and facilitate a slim size of the motor.

2. Description of the Prior Art

In general, one of functions essentially required for a communication system is a termination(incoming call) function. For such a termination function, vocalization such as melody and bell or vibration for vibrating the communication system is mostly used.

In other words, if a user in advance selects a function required for termination, the selected function is working during termination to allow the user to sense the termination.

In such a termination function, particularly, the vibration function is mainly used so as to avoid noise pollution in a place crowded with people.

The vocalization function such as melody or bell is intended to sense termination by externally transferring various kinds of melodies or bells, which are in advance input inside the system, through a small sized speaker. The vibration function is intended to vibrate the system by driving a small sized vibration motor to transfer the vibration force to a case of the system.

Figure 1:
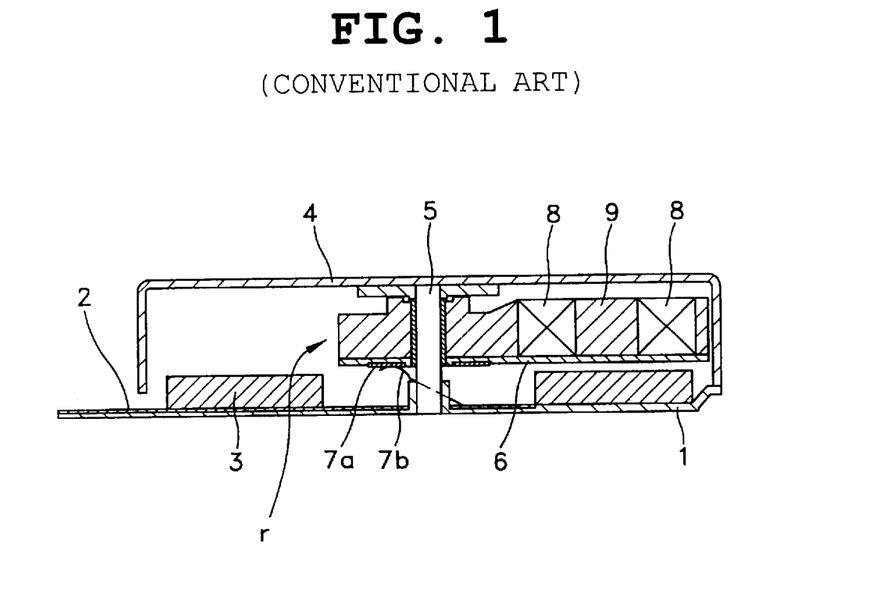
FIG. 1 is a sectional view showing a structure of a prior art flat type vibration motor.

Meanwhile, the previously used vibration function is working by a vibration motor separately mounted in the system. The most representative example of the vibration motor is a flat type vibration motor called a pan cake or coin type having a relatively large diameter as shown in FIG. 1.

The flat type vibration motor includes a fixed member, i.e., a stator, and a rotating member, a rotor r. The stator includes a magnet 3 and a case. The stator is electrically connected with the rotor r by a brush 7b.

In other words, a lower substrate 2 printed with a circuit on its surface is attached to an upper surface of a lower case 1 which is a round shaped flat panel. A doughnut shaped magnet 3 is attached to an upper surface of the lower substrate 2.

At this time, since the lower substrate 2 is attached to a part of the upper surface of the lower case 1, the magnet 3 is widely attached to the lower case 1 and the lower substrate 2.

The upper surface of the lower case 1 is covered by a cap shaped upper case 4 which is open downwardly. The lower case 1 and the upper case 4 are firmly connected with each other at their central portions by a shaft 5.

Meanwhile, a hard board has been used as the lower substrate 2 attached to the lower case 1. Recently, a flexible board is mainly used as the lower substrate 2.

In the aforementioned constitution, the stator is provided, and the rotor r is provided around the shaft 5 in the stator.

The rotor r includes an upper substrate 6 and a commutator 7a. The upper substrate 6 is eccentrically supported in the shaft 5 by cutting a round shaped flat panel at a predetermined angle. The commutator 7a includes a plurality of segments on the circumference at the bottom of a rotation central portion supported in the shaft 5 of the upper substrate 6. A winding coil 8 is attached to the upper surface of the rotor, and an insulator 9 of a general resin is integrally formed by injection molding on the upper surface of the upper substrate 6 other than the attachment surface of the winding coil 8.

In the motor which includes the stator and the rotor r, externally input power source is induced through the lower substrate 2, and the power source induced to the lower substrate 2 is supplied to the commutator 7a through the brush 7b.

The brush 7b includes a pair of power input and output brushes. These brushes are separated from each other at a constant angle. The bottom of the respective brush is fixedly connected to a circuit of the lower substrate 2 and its top portion is slidably contacted with the segments of the commutator 7a.

Accordingly, the current induced through the lower substrate 2 is transferred to the commutator 7a through the brush 7b at one side and to the winding coil 8 through the upper substrate 6. The current flows from the winding coil 8 to the upper substrate 6, the commutator 7, and the brush 7b at the other side. Thus, the winding coil 8 is always electrically connected. At this time, electromagnetic force is generated by mutual action between the winding coil 8 and the magnet 3 to obtain driving force.

At this time, since the rotor r is eccentrically supported in the shaft 5, the rotor r is eccentrically driven. Such eccentric driving force is externally transferred through the shaft 5 so as to vibrate the system.

Therefore, the performance of the vibration motor depends on the vibration amount. Since the vibration amount depends on the eccentric amount of the rotor r, it is difficult to obtain the required eccentric amount by a structure in which the upper substrate 6 is cut at a predetermined angle with respect to a round shape and the winding coil 8 is eccentrically arranged on the upper substrate 6 with respect to the rotation center.

In this respect, in the rotor r of the currently used vibration motor, the winding coil 8 is arranged on the upper substrate 6 and the insulator 9 is filled around the winding coil 8. At this time, a resin material containing metal of high specific gravity such as tungsten is used as the insulator 9 to provide the required eccentric amount. Thus, the sufficient vibration amount can be obtained.

Figure 2:
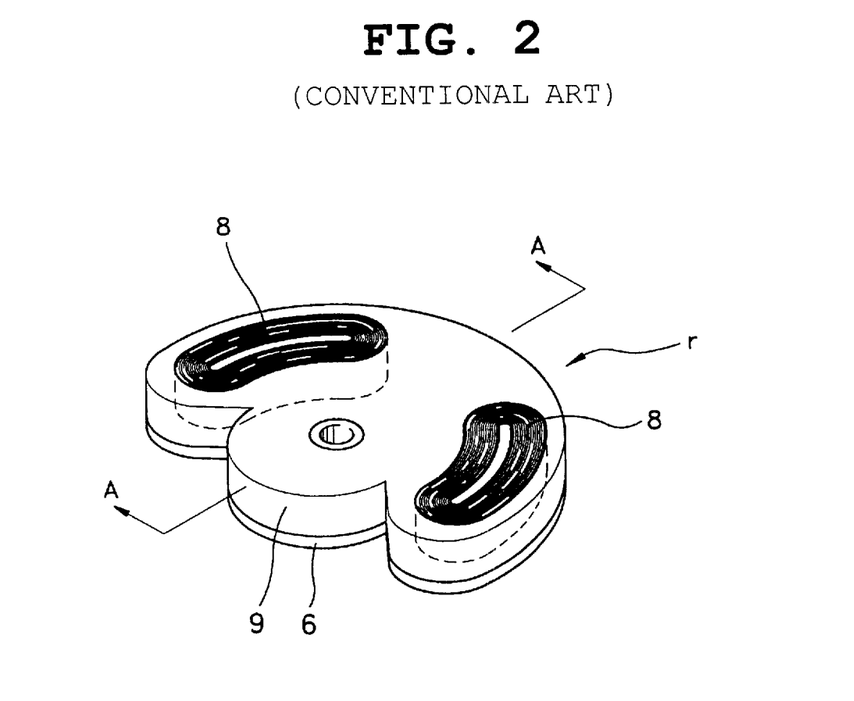
FIG. 2 is a perspective view showing a rotor in the prior art flat type vibration motor.
Figure 3:
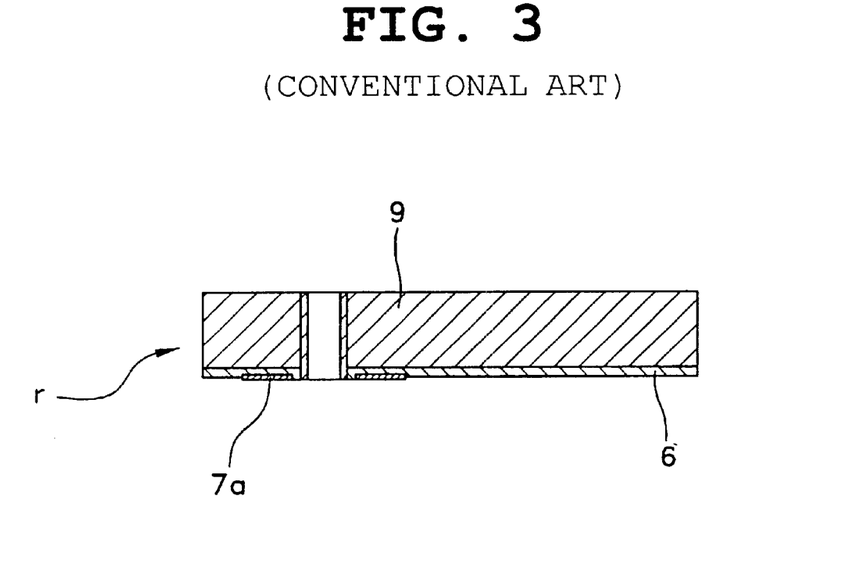
FIG. 3 is a sectional view taken along line A—A of FIG. 2.

In the aforementioned rotor r, as shown in FIG. 2, the winding coil 8 is arranged at both sides of the upper substrate 6, and the winding coil 8 is integrally coupled to the upper substrate 6 by insert injection through the insulator 9 so that the eccentric amount in the rotor r can be enhanced.

However, since the insulator 9 which couples the upper substrate 6 with the winding coil 8 by insert injection contains a metal component having high specific gravity such as tungsten, the fluidity of the insulator 9 is not good due to the tungsten component which is not likely to be melted.

Accordingly, high pressure is required during insert injection by the insulator 9. The upper substrate 6 and the winding coil 8 are deformed or short of the circuit is caused due to pressure applied by the insert injection. For this reason, the poor product is caused. Particularly, the productivity is deteriorated due to difficulty of the injection operation.

Furthermore, the insulator 9 of a high specific gravity material is substantially occupied in the rotor r at a small eccentric weight ratio. Moreover, as shown in FIG. 2, if the insulator 9 is partially formed toward the other side corresponding to one side at the center supported in the shaft 5, the insulator 9 formed at the other side decreases the eccentric amount of the rotor r, thereby deteriorating the eccentric driving force by the rotor r.

Finally, since the insulator 9 of a high specific gravity material is very expensive in view of its function performed in the rotor r, it is not economical.

SUMMARY OF THE INVENTION

It is, therefore, an object of the present invention to provide a flat type vibration motor in which a weight is provided on a round shaped upper substrate having a winding coil to prevent the eccentric amount from being reduced due to a slim thickness of the rotor, thereby facilitating a slim size of the motor.

Another object of the present invention is to provide a flat type vibration motor, in which an upper substrate is formed in a round shape to a separate cutting process is omitted, thereby reducing the production process time.

Other object of the present invention is to provide a flat type vibration motor in which the eccentric amount by the weight is maximized to improve the vibration performance of the slim sized motor.

To achieve the above object, there is provided a flat type vibration motor according to the present invention including: a lower case; an upper case which covers an upper portion of the lower case; a shaft which connects the center of the lower case with the center of the upper case and supports them; a lower substrate attached to one portion on an upper side of the lower case; a magnet attached to the lower substrate and the upper side of the lower case; a round shaped thin upper substrate rotatably supported in the shaft; a commutator provided with a plurality of segments on the circumference of the center of the shaft at the bottom of the upper substrate; a pair of brushes of which one end is fixed to the lower substrate and other end is in contact with the commutator to be electrically connected with the commutator; a pair of winding coils arranged separated from each other at a constant angle toward one side of the upper substrate; a weight of high specific gravity arranged toward the other end of the upper substrate corresponding to the winding coil; and an insulator of resin filled between the winding coils and the weight, for firmly fixing the winding coils and the weight to the upper substrate.

In another aspect, there is provided a flat type vibration motor according to the present invention including: a lower case; an upper case which covers an upper portion of the lower case; a shaft which connects the center of the lower case with the center of the upper case and supports them; a lower substrate attached to an upper side of the lower case; a magnet attached to the lower substrate and the upper side of the lower case; an upper substrate rotatably supported in the shaft and unevenly formed to be eccentrically supported in the shaft by cutting a round shaped thin plate at a predetermined angle; a commutator provided with a plurality of segments on the circumference of the center of the shaft at the bottom of the upper substrate; a pair of brushes of which one end is fixed to the lower substrate and other end is in contact with the commutator to be electrically connected with the commutator; a pair of winding coils arranged separated from each other at a constant angle toward one side of the upper substrate; a weight of high specific gravity arranged between the winding coils; and an insulator of resin filled between the winding coils and the weight, for firmly fixing the winding coils and the weight to the upper substrate.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

In a flat type vibration motor according to the present invention, a weight is provided on a round shaped upper substrate having a winding coil to prevent the eccentric amount from being reduced due to a slim thickness of the rotor, thereby facilitating a slim size of the motor.

Figure 4:
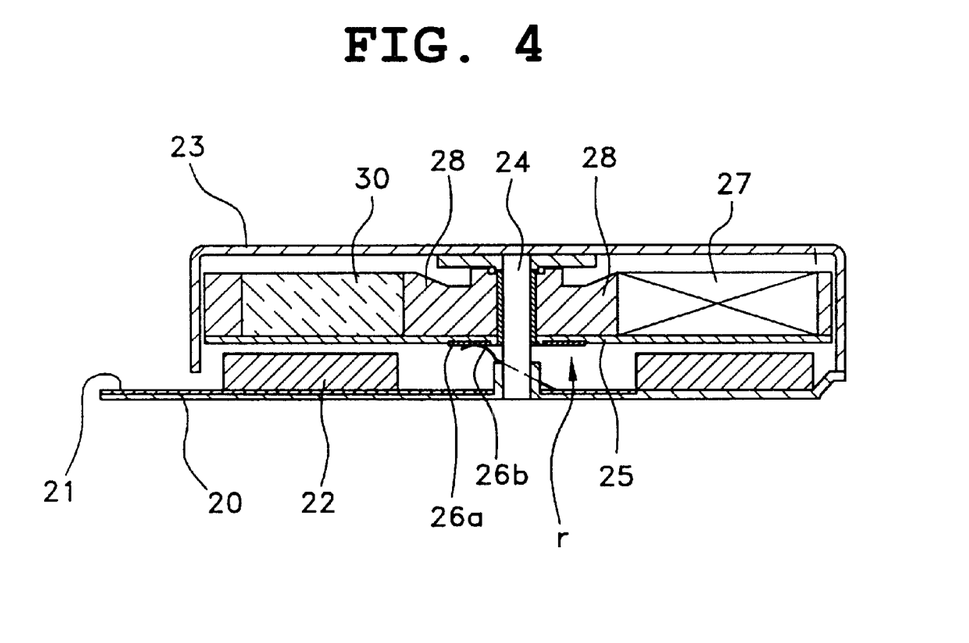
FIG. 4 is a sectional view showing a flat type vibration motor according to the present invention.
Figure 5:
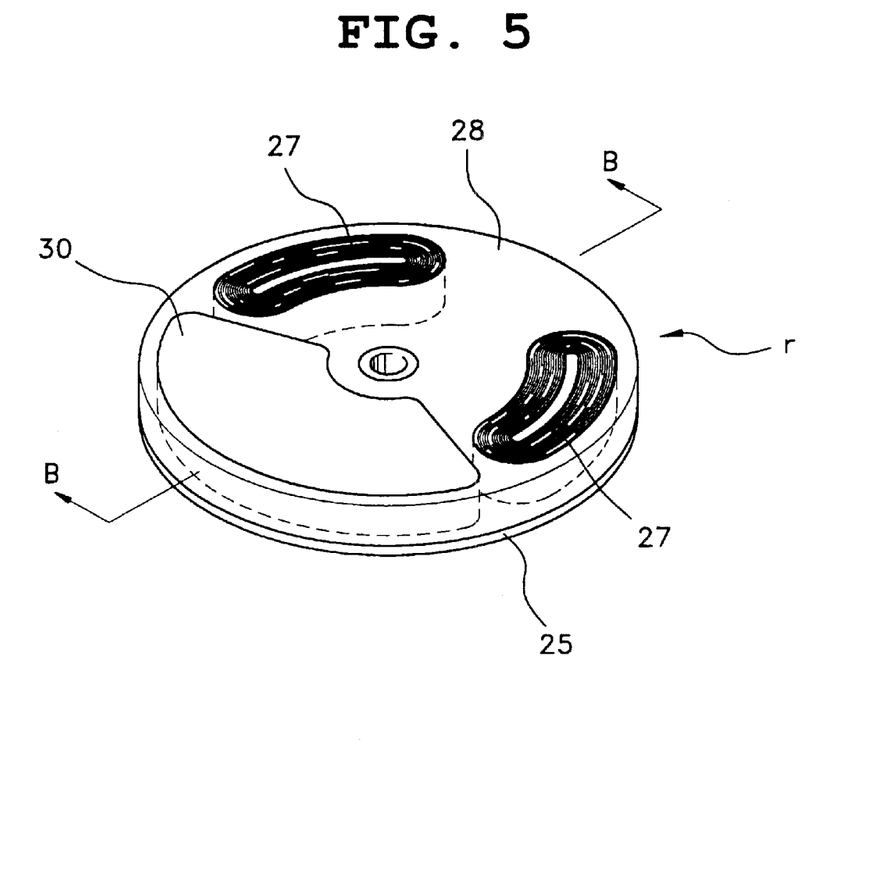
FIG. 5 is a perspective view showing a rotor in the flat type vibration motor according to the present invention.
Figure 6:
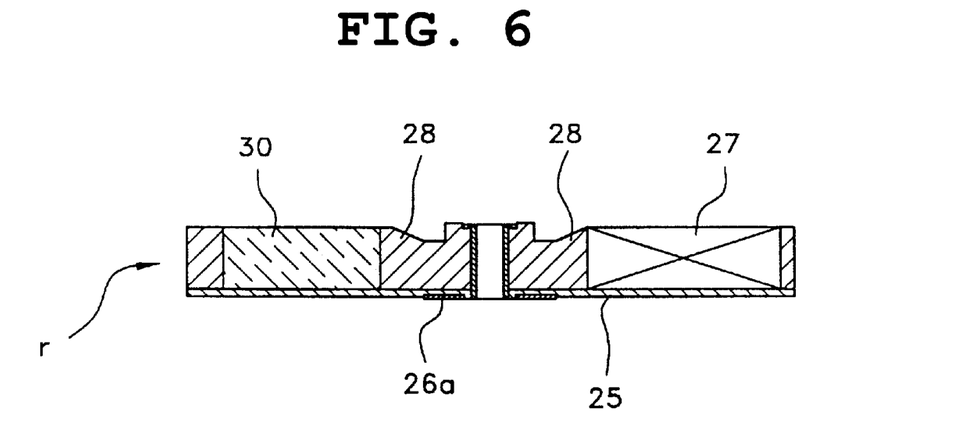
FIG. 6 is a sectional view taken along line B—B of FIG. 5.

FIGS. 4 to 6 show one embodiment of the present invention. As shown in the figures, a weight 30 is arranged in a direction corresponding to a winding coil 27 mounted on an upper substrate 25.

In other words, a lower substrate 21 is attached to a portion on an upper surface of a lower case 20, and a magnet 22 is provided on the lower substrate 21 and the upper surface of the lower case 20.

A shaft 24 is supported in the center of the lower case 20 and an upper case 23 is coupled to a top portion of the shaft 24 so that parts provided on the upper portion of the lower case 20 are safely protected from the outside.

The upper substrate 25 is rotatably and eccentrically coupled to the shaft 24. The winding coil 27 is attached to the upper surface of the upper substrate 25. A commutator 26a is provided on the bottom of the upper substrate 25 and includes a plurality of segments. The lower substrate 21 is connected with the segments of the commutator 26a by a pair of brushes 26b so that an electrical signal is transmitted between them.

In the above constitution, a rotor r of the present invention includes an upper substrate 25 which is a printed circuit board, a winding coil 27 and a weight 30 which are respectively attached to the upper substrate 25 or integrally insert injected, a commutator 26a, and an insulator 28.

The upper substrate 25 which is a thin printed circuit board has been typically formed by cutting a round shaped flat panel at a predetermined angle. However, in the present invention, it is characterized in that a round shaped flat panel is used as the upper substrate.

On such a round shaped upper substrate 25, the winding coil 27 is arranged to be eccentric toward one side from the center in the same manner as the prior art. At this time, the winding coil 27 may have a single phase, two phases, or three phases in accordance with driving characteristic of the vibration motor, and is attached to the upper substrate 25 by junction.

Meanwhile, the main feature of the present invention is characterized in that the weight 30 having high specific gravity is arranged at the other side of the upper substrate 25 corresponding to one side thereof in which the winding coil 27 is arranged.

The weight 30 is a main element which determines the eccentric amount in the rotor r. Tungsten of high specific gravity is generally used as a material of the weight 30.

The weight 30 is preferably formed in such a manner that its formation pitch is within the range of a minimum mechanical angle of 45°~180°.

As described above, in the present invention, it is characterized in that the upper substrate 25 is formed in a round shape and the weight 30 is arranged in a position corresponding to a direction in which the winding coil 27 is arranged.

Meanwhile, the commutator 26a consisting of a plurality of segments on the circumference of the center supported in the shaft 24 is formed on the bottom of the upper substrate 25 in the same manner as the prior art. On the upper surface of the upper substrate 25 in which the winding coil 27 and the weight 30 are arranged, the insulator 28 is molded at a predetermined thickness by insert injection to a portion other than the winding coil 27 and the weight 30.

At this time, the insulator 28 is a general resin based insulator formed by insert injection directly after the winding coil 27 and the weight 30 are attached to the upper substrate 25 by junction.

The commutator 26a is slidably contacted with the upper end of the brush 26b at the bottom by forming a plurality of the segments on the bottom of the upper substrate 25 at constant intervals. The segments are electrically connected with a circuit printed on the upper substrate 25.

As described above, the upper substrate 25 of the present invention has a perfect round shape, its center is supported in the shaft 24, and a pair of the winding coils 27 are arranged at one side of the upper substrate 25 in the same manner as the prior art.

If the winding coil 27 is arranged toward one side of the upper substrate 25, the weight 30 is widely arranged on the upper substrate 25 of the other side corresponding to the one side.

In this case, load of the upper substrate 25 acts toward the heavy weight 30, so that the upper substrate 25 is slanted toward the weight 30.

In other words, a pair of the winding coils 27 are arranged at one side of the upper substrate 25 to be separated from each other at a predetermined angle, and the weight 30 is widely arranged at the other side. In this case, since the weight of the winding coil 27 is small, eccentric load acts toward the relatively heavy weight 30.

As described above, if the weight 30 is widely formed at the other side of the upper substrate 25 corresponding to the winding coil 27, the eccentric amount of the weight 30 is increased to enhance vibration.

At this time, since the weight of the winding coil 27 is small, the winding coil 27 little acts on the eccentric load of the weight 30.

Meanwhile, the weight 30 is formed on the upper substrate 25 in such a manner that its formation pitch is within the range of a minimum mechanical angle of 45°. Preferably, the weight 30 is formed in a size to approach its both ends to both ends of the winding coil 27.

The weight 30 is formed in such a manner that its bottom surface is attached to the upper substrate 25 by an adhesive. If the weight 30 is formed in a size to approach both ends of the weight 30 to both ends of the winding coil 27, the adhesive is simultaneously deposited on an end of the winding coil 27 and the bottom of the upper substrate 25, so that the substrate 25 is maintained at a firm fixed state.

In an area other than the winding coil 27 and the weight 30, the insulator 28 is molded by insert injection at the same height as that of the winding coil 27 as shown in FIG. 5.

At this time, the insulator 28 insulates electrical characteristic from the winding coil 27 and at the same time acts to stably maintain the state in which the winding coil 27 and the weight 30 are firmly attached to the upper substrate 25.

Particularly, the insulator 28 is formed of a material of low specific gravity so as not to affect the eccentric amount of the weight 30. It is most preferable that general synthetic resins are used as the insulator 28.

Figure 7:
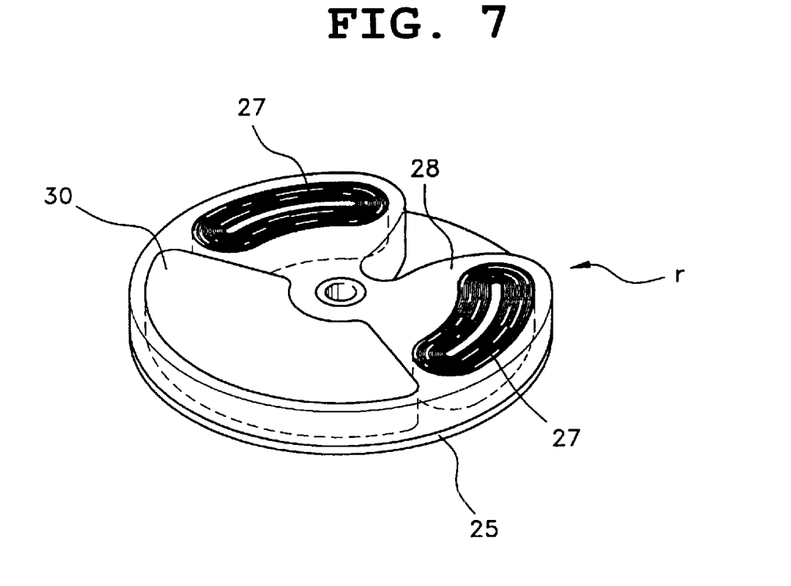
FIG. 7 is a perspective view showing another embodiment of FIG. 5.

It is preferable that the insulator 28 is not molded in a space formed between a pair of the winding coils 27 to enhance the eccentric amount of the weight 30 as shown in FIG. 7.

Figure 8:
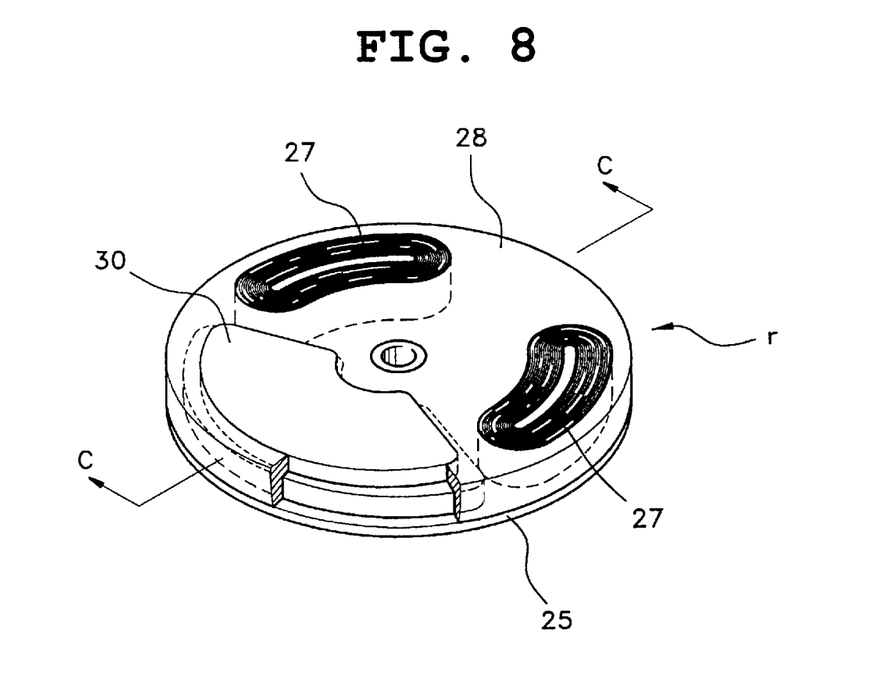
FIG. 8 is a perspective view showing a flat type vibration motor according to the second embodiment of the present invention.
Figure 9:
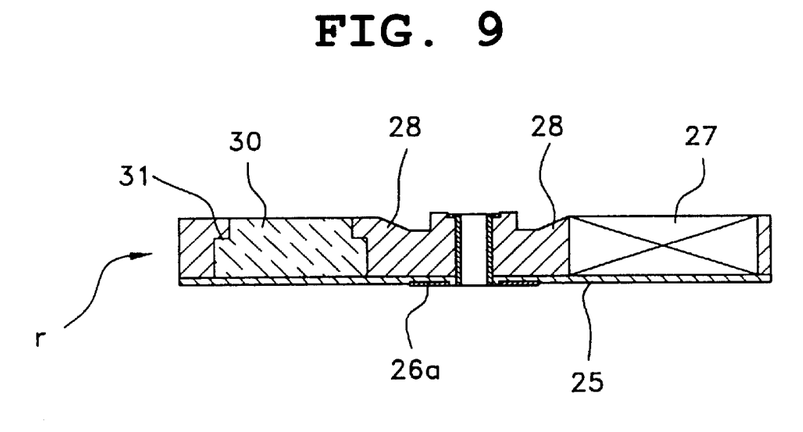
FIG. 9 is a sectional view taken along line C—C of FIG. 8.

Meanwhile, FIGS. 8 and 9 show the flat type vibration motor according to the second embodiment of the present invention. The rotor r in this embodiment includes an upper substrate 25 which is a printed circuit board, a winding coil 27 and a weight 30 which are respectively attached to the upper substrate 25 or integrally insert injected, a commutator 26a, and an insulator 28.

In the above rotor r, a round shaped flat panel is used as the upper substrate 25. On such a round shaped upper substrate 25, the winding coil 27 is arranged to be eccentric toward one side from the center. At this time, the winding coil 27 may have a single phase, two phases, or three phases in accordance with driving characteristic of the vibration motor, and is attached to the upper substrate 25 by junction.

Meanwhile, the weight 30 having high specific gravity such as tungsten is arranged at the other side of the upper substrate 25 corresponding to one side thereof in which the winding coil 27 is arranged.

The weight 30 may be formed in such as manner that its formation pitch is within the range of a minimum mechanical angle of 45°~180° depending on the eccentric amount of the motor.

The above constitution is equal to that of the flat type vibration motor shown in FIGS. 4 to 6. However, in this embodiment, it is characterized in that a step portion 31 is formed on the circumference of the weight 30.

In other words, in the rotor r of this embodiment, the upper substrate 25 is formed in a round shape, the weight 30 is arranged in a position corresponding to a direction in which the winding coil 27 is arranged, and the step portion 31 is formed on the circumference of the weight 30.

At this time, the size and the width of the step portion 31 are preferably set to improve the intensity of the insulator 28 without affecting the vibration amount according to the weight 30.

Meanwhile, the commutator 26a consisting of a plurality of segments at the circumference of the center supported in the shaft 24 is formed on the bottom of the upper substrate 25 in the same manner as the aforementioned embodiment. On the upper surface of the upper substrate 25 in which the winding coil 27 and the weight 30 are arranged, the insulator 28 is molded at a predetermined thickness by insert injection to a portion other than the winding coil 27 and the weight 30.

At this time, the insulator 28 insulates electrical characteristic from the winding coil 27 and at the same time acts to stably maintain the state in which the winding coil 27 and the weight 30 are firmly attached to the upper substrate 25. As an example of the insulator 28, there is a general resin based insulator formed by insert injection directly after the winding coil 27 and the weight 30 are attached to the upper substrate 25 by junction.

In other words, the insulator 28 is formed of a material of low specific gravity so as not to affect the eccentric amount of the weight 30. It is preferable that general synthetic resins are used as the insulator 28.

Figure 10:
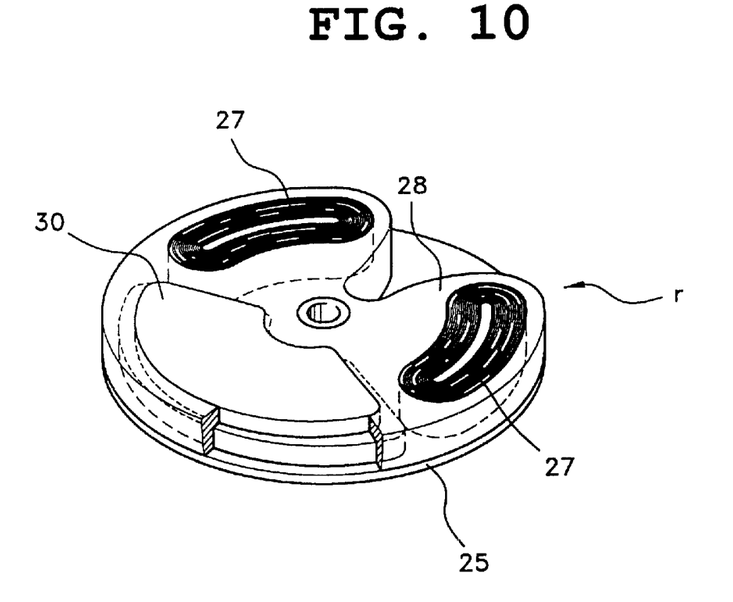
FIG. 10 is a perspective view showing another embodiment of FIG. 8.

Particularly, it is preferable that the insulator 28 is not molded in a space formed between a pair of the winding coils 27 to enhance the eccentric amount of the weight 30 as shown in FIG. 10.

The commutator 26a is slidably contacted with the upper end of the brush 26b at the bottom by forming a plurality of the segments on the bottom of the upper substrate 25 at constant intervals. The segments are electrically connected with a circuit printed on the upper substrate 25.

As described above, in the rotor r of this embodiment, the upper substrate 25 has a round thin shape, its center is supported in the shaft 24, and a pair of the winding coils 27 are arranged at one side of the upper substrate 25 in the same manner as the aforementioned embodiment.

If the winding coil 27 is arranged toward one side of the upper substrate 25, the weight 30 provided with the step portion 31 on its circumference is widely arranged on the upper substrate 25 of the other side corresponding to the one side. At this time, since the insulator 28 of resin material, which includes the weight, has an increased thickness at the step portion 31, rigidity is improved.

Accordingly, the step portion 31 is firmly received in the insulator 28. Even if the intensity of the insulator 28 of resin material is weak, the weight 30 is prevented from being detached from the rotor r by rotating force and centrifugal force.

Particularly, one end of the insulator 28 surrounding the step portion 31 of the weight 30 absorbs the rotating force and centrifugal force generated in the weight 30 and scatters them. That is, as the rotating force and the centrifugal force finally act on the circumference end of the insulator 28 having a relatively thick thickness, the rotating force and the centrifugal force generated in the weight 30 are easily absorbed and scattered.

In the aforementioned rotor r, the insulator 28 is integrally molded in an area other than the winding coil 27 and the weight 30 by insert injection at the same height as that of the winding coil 27, as shown in FIG. 8.

The operation of the aforementioned flat type vibration motor will now be described.

In the rotor r, since the upper substrate 25 is formed in a round shape and the weight 30 is widely formed in a position corresponding to the winding coil 27, it is possible to greatly enhance the eccentric load toward the weight 30.

Particularly, in the prior art rotor r, since an area occupied by the insulator 28 having high specific gravity arranged between a pair of the winding coils 27 by insert injection has been limited by the winding coils 27, there has been a limitation in increasing the eccentric amount.

However, in the present invention, the upper substrate 25 has a round shape, the winding coil 27 is arranged at one side of the upper substrate 25, and the weight 30 is arranged at the other side thereof, so that an area occupied by the weight 30 is increased, thereby weighting the weight 30.

Such a weight increase of the weight 30 significantly acts on the eccentric amount of the rotor r. For this reason, the vibration characteristic of the vibration motor can be improved.

Particularly, in case of the slim motor according to recent tendency of miniaturization and slim size in the system, the eccentric amount is inevitably reduced in the prior art. However, in this embodiment of the present invention, since the area of the weight 30 is increased, the eccentric amount is prevented from being reduced. Thus, greater eccentric amount can be obtained.

Meanwhile, in the present invention, since the weight 30 is arranged so as not to be affected by the winding coil 27, it is very useful for design and layout of the rotor r. Accordingly, it is possible to facilitate assembly of the winding coil 27 and the weight 30 on the upper substrate 25.

Furthermore, since the size of the weight 30 can be controlled, the most idealistic eccentric amount required by the vibration motor can be determined.

Figure 11:
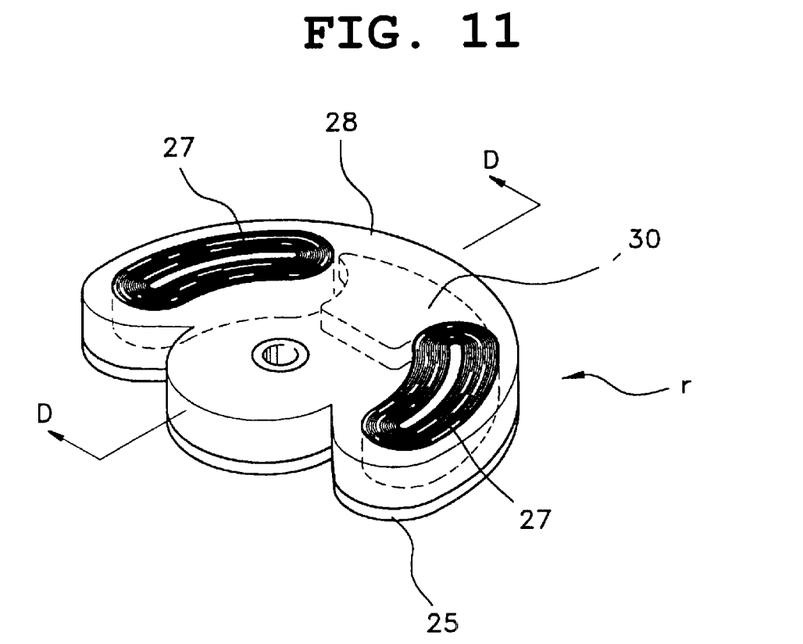
FIG. 11 is a perspective view showing a flat type vibration motor according to the third embodiment of the present invention.
Figure 12:
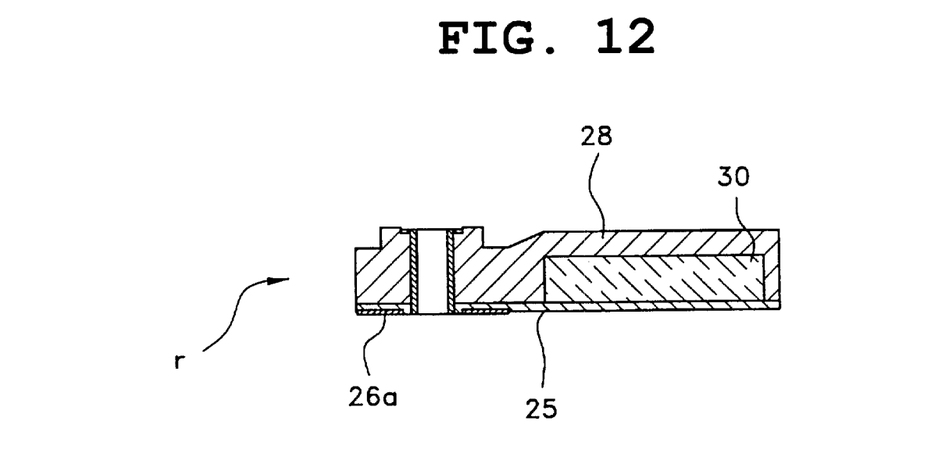
FIG. 12 is a sectional view taken along line D—D of FIG. 11.

Meanwhile, FIGS. 11 and 12 show the flat type vibration motor according to the third embodiment of the present invention.

The rotor r in this embodiment includes an upper substrate 25 formed by cutting a round shaped flat panel at a predetermined angle, a pair of winding coils 27 arranged to be separated from each other at a predetermined electric angle on the upper substrate 25, and a weight 30 having high specific gravity arranged between the winding coils 27. The upper substrate 25, the winding coils 27, and the weight 30 are integrally coupled to one another by insert injection together with an insulator 28 of resin material having low specific gravity.

In other words, the rotor r in this embodiment includes the upper substrate 25, the winding coils 27, the weight 30, and the insulator 28. The winding coils 27 are arranged at both sides of one side of the upper substrate 25 and are separated from each other at a predetermined electric angle. The weight 30 is arranged on the outer circumference of the upper substrate 25 in a space between the winding coils 27.

The winding coils 27 and the weight 30 provided on the upper substrate 25 are coupled to each other by insert injection together with the insulator 28 of a general resin material.

At this time, the insulator 28 that acts to connect the upper substrate 25, the winding coils 27, and the weight 30 with one another is formed of a pure resin material no containing a metal component to insulate electrical characteristic from the winding coils 27. It is preferable that synthetic resins having excellent fluidity and low specific gravity is used as the insulator 28.

Furthermore, between the winding coils 27 provided at both sides of the upper substrate 25, the weight 30 is arranged on the outer circumference from the rotation center supported in the shaft 24 of the upper substrate 25. At this time, a material such as tungsten having high specific gravity is preferably used as the weight 30.

Therefore, if the weight 30 is arranged between the winding coils 27 provided on the upper substrate 25, the eccentric amount in the rotor r can be enhanced. As a result, since greater eccentric driving force of the rotor r can be obtained during driving of the vibration motor, the vibration characteristic can be improved.

Since the insulator 28 having low specific gravity has excellent fluidity, high injection pressure is not required unlike the prior art. Accordingly, it is possible to avoid deformation and short of the upper substrate 25 or the winding coils 27.

What is claimed is:

1. A flat type vibration motor comprising:

a lower case;

an upper case which covers an upper portion of said lower case;

a shaft which connects the center of said lower case with the center of said upper case and supports them;

a magnet having at least two poles and attached to an upper portion of said lower case;

an upper substrate rotatably and eccentrically supported on said shaft and having a commutator provided with a plurality of segments on the circumference of the center of said shaft at a bottom of said substrate;

a pair of brushes in contact with said commutator to be electri-cally connected with said commutator;

at least two winding coils arranged separated from each other at a predetermined angle on said upper substrate;

a weight arranged between said winding coils on said upper substrate; and a rotor integrally formed by insert injection with a general resin and said upper substrate having said winding coils and said weight fixed thereon, wherein a portion filled with said resin on the circumference of said weight between said winding coils coincides with the circumference of said upper substrate.

2. The flat type vibration motor as claimed in claim 1, wherein the weight has a height substantially corresponding to said winding coils arranged on the upper substrate.

* * * * *